US009270021B1

(12) United States Patent
Harvey et al.

(10) Patent No.: US 9,270,021 B1
(45) Date of Patent: Feb. 23, 2016

(54) LOW-PROFILE MAST ARRAY

(71) Applicant: MMA Design, LLC, Boulder, CO (US)

(72) Inventors: Thomas Jeffrey Harvey, Nederland, CO (US); Jeffrey Edwin Oroke, Boulder, CO (US); Ryan M. VanHalle, Golden, CO (US)

(73) Assignee: M.M.A. Design, LLC, Boulder, CO (US)

( * ) Notice: Subject to any disclaimer, the term of this patent is extended or adjusted under 35 U.S.C. 154(b) by 0 days.

(21) Appl. No.: 14/480,574

(22) Filed: Sep. 8, 2014

Related U.S. Application Data

(60) Provisional application No. 61/874,500, filed on Sep. 6, 2013.

(51) Int. Cl.
*F16M 13/00* (2006.01)
*H01Q 3/08* (2006.01)

(52) U.S. Cl.
CPC .................................... *H01Q 3/08* (2013.01)

(58) Field of Classification Search
CPC ....... A61B 19/26; F16M 11/00; F16M 11/20; F16M 11/2078
See application file for complete search history.

(56) References Cited

U.S. PATENT DOCUMENTS 5,314,466 A 5/1994 Stern et al.
6,315,252 B1 * 11/2001 Schultz ............... B60R 11/0252 108/44
6,688,564 B2 * 2/2004 Salvermoser .......... A61B 19/26 248/160
7,250,027 B2 7/2007 Barry
7,690,619 B2 4/2010 Wolfersberger
8,069,747 B2 12/2011 Buckingham et al.
8,266,882 B2 9/2012 Hermey et al.
8,535,347 B2 9/2013 Danitz et al.
8,578,810 B2 11/2013 Donhowe

* cited by examiner

*Primary Examiner* — Amy Sterling
(74) *Attorney, Agent, or Firm* — Christopher J. Kulish

(57) ABSTRACT

One embodiment of the invention is directed to an array of articulable masts for use with an array of directional elements. In a particular embodiment, each of the masts employs: (a) a linked structure with a plurality of pivotally connected links that includes a fixed link which is attached to a base and a free link which is adapted to support a directional antenna and (b) a wire structure that engages the linked structure. The array also includes a rotor structure that engages the corresponding wire structure associated with each of the linked structures. In operation, rotation of the rotor structure causes the free ends of the linked structures to move such that the boresights of any attached directional elements are moved at the substantially the same time and in the same way and so that each boresight is collinear or parallel to a radius of a spherical section.

34 Claims, 19 Drawing Sheets

LOW-PROFILE MAST ARRAY

FIELD OF THE INVENTION

The present invention relates to a low-profile mast array for use in selectively positioning directional elements in an array of directional elements.

BACKGROUND OF THE INVENTION

Directional elements have been developed that process transverse electromagnetic waves. For example, directional radio frequency antennas (e.g., a parabolic dish antenna) and directional optical elements (e.g., lasers and CCDs) have been developed. Directional elements have also been developed that process longitudinal waves. For example, directional microphones have been developed. Characteristic of directional elements is a boresight, the axis of maximum gain with respect to the signal being processed by the element. The boresight of a directional antenna is the axis of maximum gain in the antenna's radiation pattern. For example, in an axially-fed parabolic dish antenna, the boresight is the axis of symmetry of the parabolic dish. Many applications for directional elements require that the boresight of the element be adjustable. For example, if a directional antenna is used to track a moving object, the position of the boresight of the directional antenna typically must be moved to keep the moving object within the radiation pattern at or near the boresight.

To move a directional element, a mast is employed that is capable of moving the boresight of the element within some defined range. Typically, such masts employ a gimbal mechanism to facilitate the positioning of the boresight of the element. The gimbal mechanism extends from a first end that is attached to a base to a second end that is attached to the directional element structure. Associated with the gimbal mechanism is an x-y-z orthogonal coordinate system. Rotation about the x, y, and z axes can respectively be defined as pitch, yaw, and roll. The gimbal mechanism typically includes two gimbals, the first gimbal providing the ability to roll the directional element structure within a defined range and the second gimbal providing the ability to pitch/yaw the directional element structure within a define range. The range of motion of the first and second gimbals defines the spherical section within which the boresight of the directional element can be positioned. Typically, the first gimbal supports the second gimbal and the second gimbal supports the directional element. Further, the first gimbal also typically supports the motor used to rotate the directional element about the second gimbal. Consequently, the motor used to rotate the first gimbal must rotate the first gimbal, second gimbal, directional element, and motor for rotating the directional element about the second gimbal.

The volume needed to accommodate a directional element and a gimbal mechanism for positioning the boresight of the directional element is directly proportional to the dimensions of the directional element and the extent of the spherical section within which the boresight can be positioned. For example, as the dimensions of a directional antenna increase with the spherical extent being held constant, the greater the volume needed to accommodate the antenna and gimbal mechanism. Likewise, as the spherical extent increases with the dimensions of antenna being held constant, the greater the volume needed to accommodate the antenna structure and gimbal mechanism. Of particular concern in many applications is the height of this volume. For example, when a directional antenna and gimbal are disposed substantially outside the typical exterior surface of an aircraft (typically, under some kind of cover), the height of the volume occupied by the antenna and gimbal mechanism typically increases drag and/or changes the performance of the aircraft. Further, the height of the antenna and gimbal mechanism (or related cover) also creates a visual signature that is undesirable in particular instances.

SUMMARY OF THE INVENTION

An array of articulable masts capable of adjusting the boresights of a corresponding array of directional elements is provided. The array of articulable masts is occasionally referred to hereinafter as "the mast array" or "the array of masts." Similarly, the array of directional elements is occasionally referred to hereinafter as "the element array," "directional element array," or "the array of directional elements." In the context of a two-dimensional (planar) mast array and corresponding element array, the combination of the mast array and element array has a significantly lower height profile relative to the combination of a gimbal and single directional element where the element array has a gain comparable to the single directional element for a particular orientation of the elements in the element array and the mast array is capable of adjusting the boresights of the element array over substantially the same spherical extent as the gimbal is capable of adjusting the single element. In this regard, the mast array has a lower profile than the gimbal. In the context of layouts of mast arrays and corresponding element arrays that are not planar, the mast array provided a lower profile relative to a gimbal in many instances.

In the one embodiment, the mast array includes a base structure and a plurality of linked structures. Each of the linked structures includes a plurality of links that are pivotally connected to one another. The plurality of links includes a fixed terminal link and a free terminal link. The fixed terminal link is attached to the base such that the position of the link is substantially fixed relative to the base and pivotally connected to one other link. The free terminal link includes a directional element interface for engaging a directional element and is capable of being pivotally moved relative to the fixed terminal link to reposition the boresight of a directional element attached to the interface. The free terminal link is pivotally connected to one other link. A linked structure may have only a fixed terminal link and a free terminal link that are pivotally connected to one another. However, in many applications, the linked structure includes one or more intermediate links located between the fixed and free terminal links. Any such intermediate links are pivotally connected to two other links in the linked structure. The mast array also includes a plurality of wires with each wire operatively engaging one of the linked structures. A rotor structure engages the corresponding wires associated with each of a plurality of linked structures. In operation, actuation of the rotor structure moves the wires associated each of the linked structures which, in turn, move the free terminal links, any directional elements associated with the free terminal links, and the boresight of each such directional element.

The rotor structure is adaptable to different mast arrays. In one embodiment, the rotor structure associated with a linear one-dimensional mast array includes a single-piece rotor that engages the wires associated with at least two of the linked structures in the array. Alternatively, the rotor structure includes at least two aligned sub-rotors with each of the sub-rotors is associated with and engaged to a wire associated with one the linked structures. In this case, the rotor structure includes a sleeve that connects adjacent pairs of the aligned sub-rotors to one another. In another embodiment, the rotor structure associated with a stepped linear one-dimensional mast array includes at least two parallel sub-rotors with each of the sub-rotors associated with and engaging a wire associated with one of the linked structures. In this case, the rotor structure includes a coupler for coupling the parallel but separated sub-rotors. In one embodiment, the coupler includes a pair of gears with one gear associated with each of the sub-rotors. Alternatively, the coupler can include a pair of pulleys that are coupled to one another via a belt. In yet a further embodiment, the rotor structure associated with a two-dimensional mast array includes at least two non-parallel sub-rotors with intersecting longitudinal axes and with each of the sub-rotors associated with and engaging a wire associated with one of the linked structures. In this case, the rotor structure includes a coupler for coupling the sub-rotors. In one embodiment, the coupler includes a pair of bevel/face gears with one gear associated with each of the sub-rotors. Alternatively, the coupler can include universal joint. One or a combination of these various rotor structures can be used to facilitate the construction of three-dimensional mast arrays. For instance, a mast array comprised of two or more one-dimensional linear mast sub-arrays disposed on a portion of a cylindrical surface with each of the sub-arrays extending parallel to the longitudinal axis of the cylinder can employ a rotor structure comprised of a single-piece rotor for each of the linear mast sub-arrays with the single-piece rotors coupled to one another by gears or pulley coupling systems. In many embodiments, a single motor can be used to drive the positioning of a rotor structure that engages a corresponding wire associated with each of the linked structures in the mast array.

In a particular embodiment, there are two wires associated with each linked structure. The first of the two wires engages a linked structure so as to be able to apply opposing moment forces to the linked structure relative to a first pivot axis associated with the linked structure. The second of the two wires engages the linked structure so as to apply opposing moment forces to the linked structure relative to a second pivot axis that is orthogonal to the first pivot axis. The rotor structure includes two sub-rotor structures that are each located in a plane that is perpendicular to the longitudinal axis of the linked structure when the links are aligned with one another. In many applications, positioning the sub-rotor structures in this manner facilitates the low-profile of the mast. One of the sub-rotor structures engages the first wire associated with the linked structures and the other sub-rotor structure engages the second wire associated with the linked structures. Because the first and second pivot axes are orthogonal, the two sub-rotor structures can be used to effect positioning of the free terminal link, any antenna associated with the free terminal link, and the boresight any such antenna so as to be coincident or parallel to a radius of a spherical section. Consequently, each of the masts in the array of masts achieves comparable positioning to that achieved with a gimbal. However, each of the masts achieves this positioning by providing the ability to pitch and yaw the free terminal link. In contrast, a gimbal achieves this positioning of an antenna by rolling and pitching/yawing the antenna. In a particular embodiment, the two sub-rotor structures can be coupled with corresponding sub-rotor structures associated with other linked structures. It should also be appreciated that, when only one wire is associated with each of the linked structures, the rotor structure is used to effect positioning of each of the antennas so as to be coincident or parallel to a radius of a circular section.

DETAILED DESCRIPTION

An array of articulable masts capable of adjusting the boresights of a corresponding array of directional elements is provided. The mast array is capable of presenting a lower height profile relative to a single mast that supports a directional element of comparable gain to the gain of element array supported by the mast array.

Figure 1A:
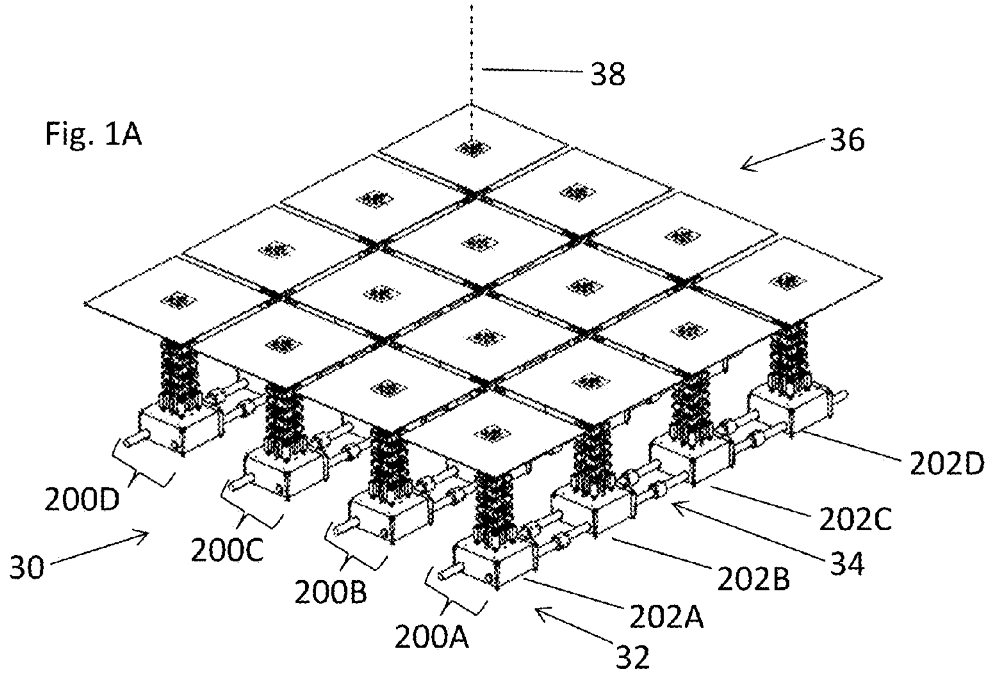
FIGS. 1A and 1B are perspective views of an embodiment of a low-profile mast array that is supporting a directional element array FIGS. 2A and 2B respectively are a perspective view and cross-sectional view of the spherical section within which each of the articulable masts in the array shown in FIGS. 1A and 1B is capable of positioning the boresight of an associated directional element such that the boresight is coincident with or parallel to a radius of the spherical section.
Figure 1B:
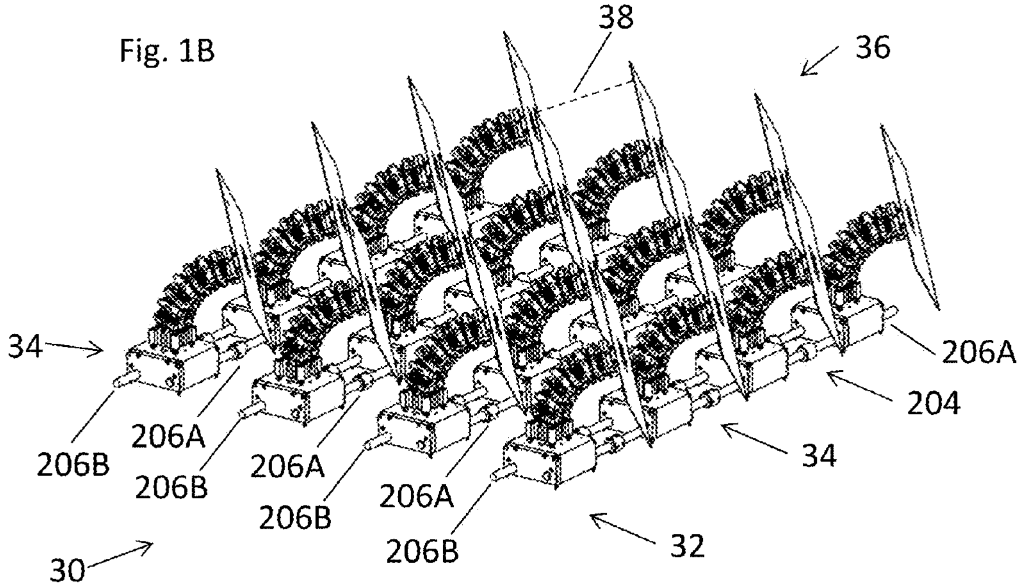

With reference to FIGS. 1A and 1B, an embodiment of an array of articulable masts, hereinafter mast array 30, is described. The mast array 30 is comprised of: (a) a plurality of articulable masts 32 that are each adapted to support a directional element and to be used to move the directional element such that the boresight of the directional element is coincident with or parallel to a radius of a spherical section and (b) a rotor structure 34 that engages each of the plurality of articulable masts 32 and operates so as to move each of the articulable masts 32 at substantially the same time and in substantially the same way. In the illustrated embodiment, the plurality of articulable masts 32 is supporting an array of directional elements 36 with each articulable mast 32 supporting one of directional elements in the array of directional elements 36. Each of the directional elements 36 has a boresight 38. In the illustrated embodiment, operation of the rotor structure 34 moves each of the articulable masts 32 at substantially the same time and in substantially the same way. To elaborate, FIG. 1A illustrates the plurality of articulable masts 32 supporting the array of directional elements 36 such that the elements collectively define a plane and the boresights of the elements are substantially parallel to one another. With reference to FIG. 1B, the rotor structure 34 has been used to move each of the articulable masts 32 and the directional element associated with each of the masts at substantially the same time and in substantially the same way. However, the movement is such that the directional elements no longer collectively define a plane but the boresights of the directional elements are still substantially parallel to one another.

Figure 2B:
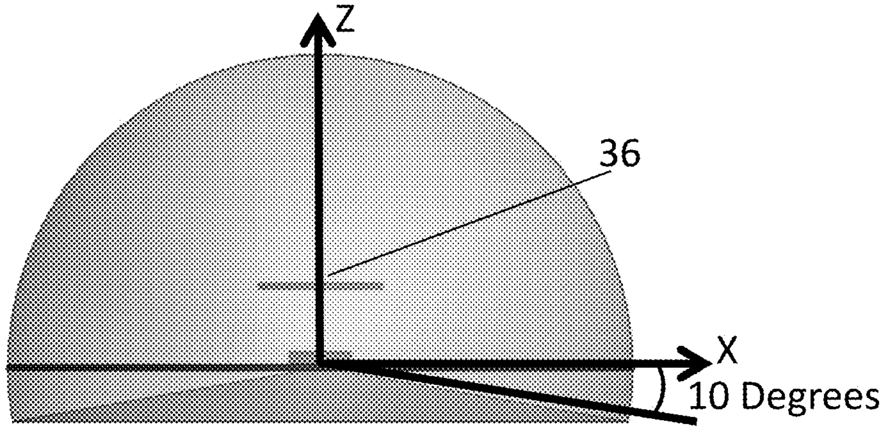
Figure 2A:
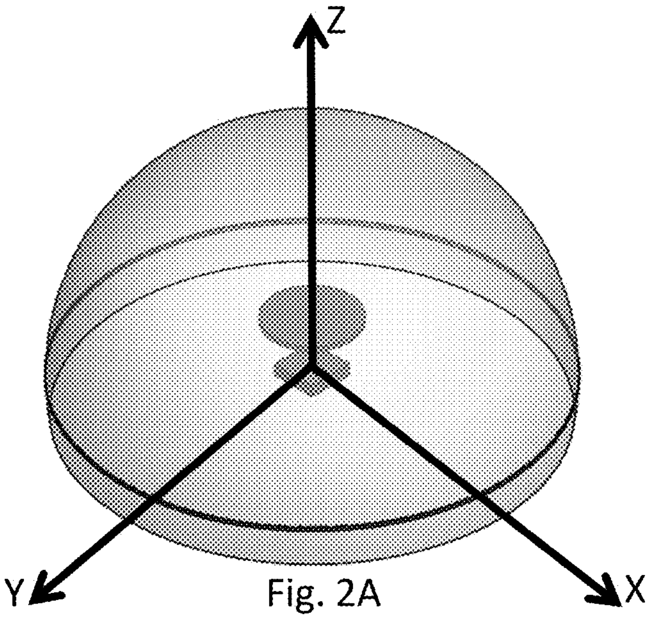

With reference to FIGS. 2A and 2B, each of the articulable masts 32 is capable of being used to position the boresight of a directional element 36 coincident with or parallel to a radius of spherical section 40 that is comprised of a hemisphere 42 plus an additional spherical section 44 that extends 10° beyond the edge of the hemisphere. Since the mast array 30 operates to substantially maintain the boresights of the array of directional elements 36 substantially parallel to one another, the mast array 30 operates to position all of the boresights of the directional elements 36 coincident with or parallel to a radius of a spherical section 40.

With reference to FIGS. 3A-3D, the plurality of articulable masts 32 each includes a mast base 50, a linked structure 52, first and second wires 54A, 54B, and first and second sub-rotors 56A, 56B. The term "wire" as applied to the first and second wires 54A, 54B refers to a flexible structure capable of transmitting a force between a rotor and a related linked structure. In this regard, the wire can be made of a metal, a polymer, a composite or other material known to those skilled in the art. Further, the wire can have any of a number of cross-sectional shapes, including but not limited to circular cross-section or rectangular cross-section.

Figure 3A:
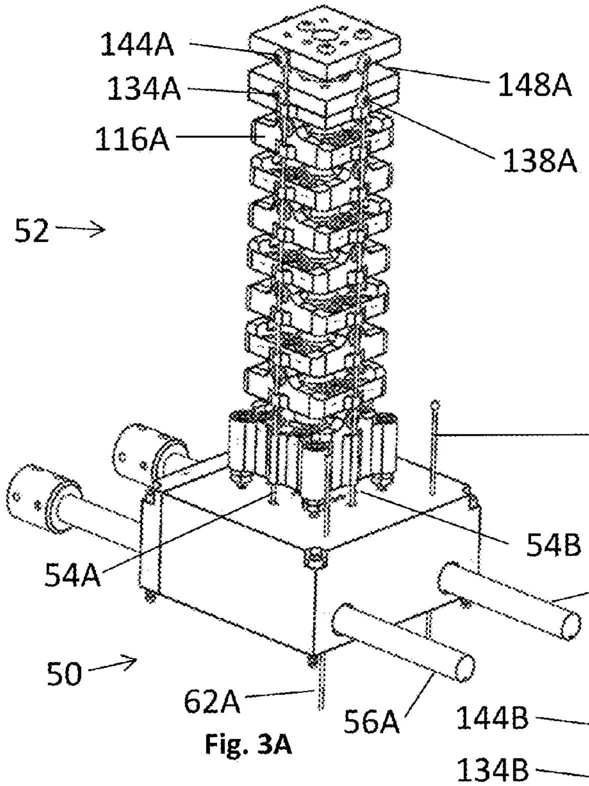
FIGS. 3A-3D respectively are a first perspective view, second perspective view, first side view, and second side view of one of the articulable mast in the mast array shown in FIGS. 1A and 1B.
Figure 3B:
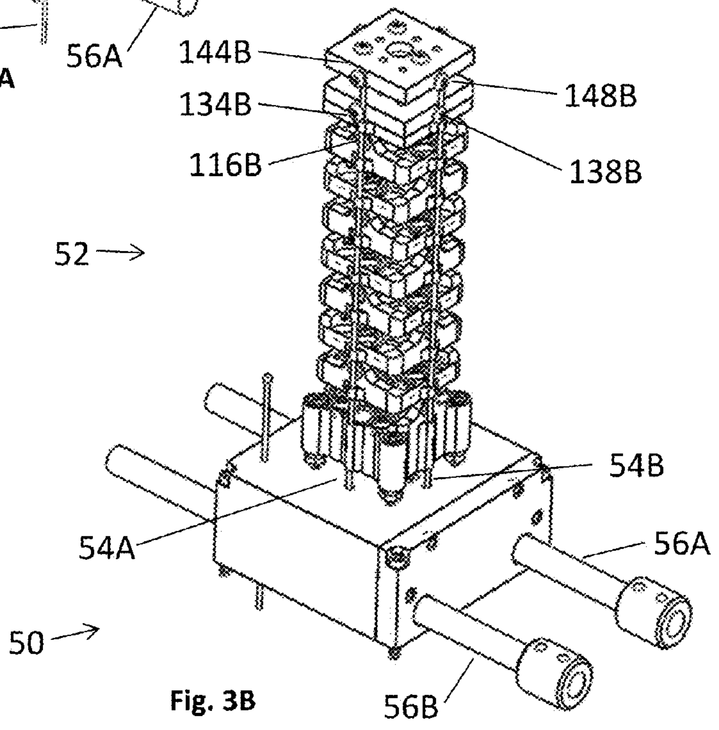
Figure 3C:
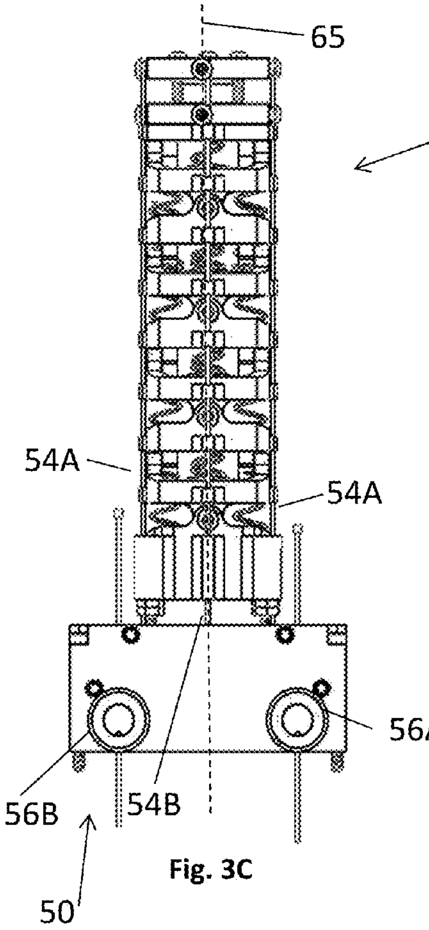
Figure 3D:
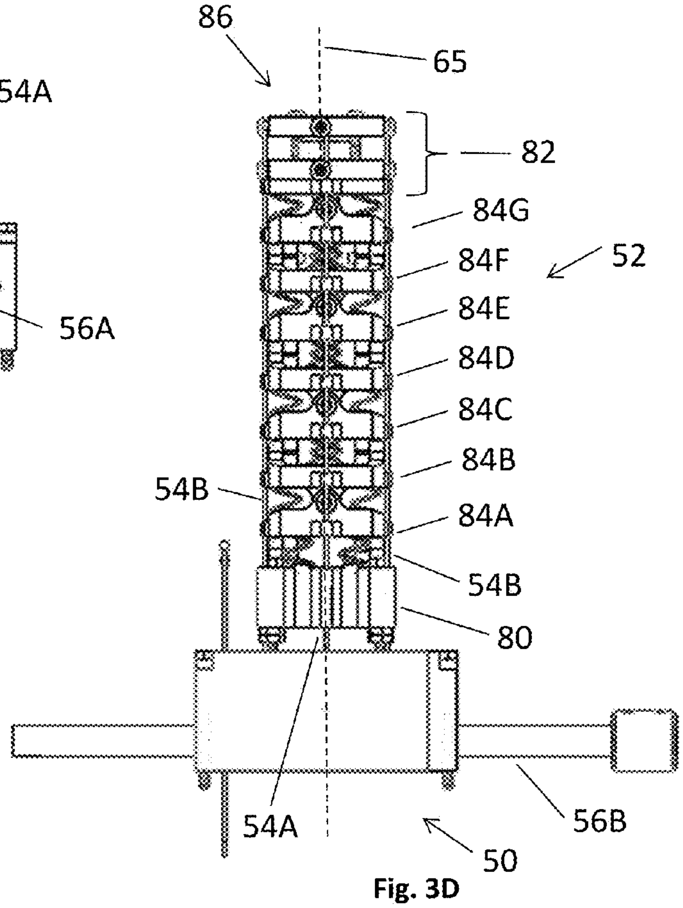
Figure 4A:
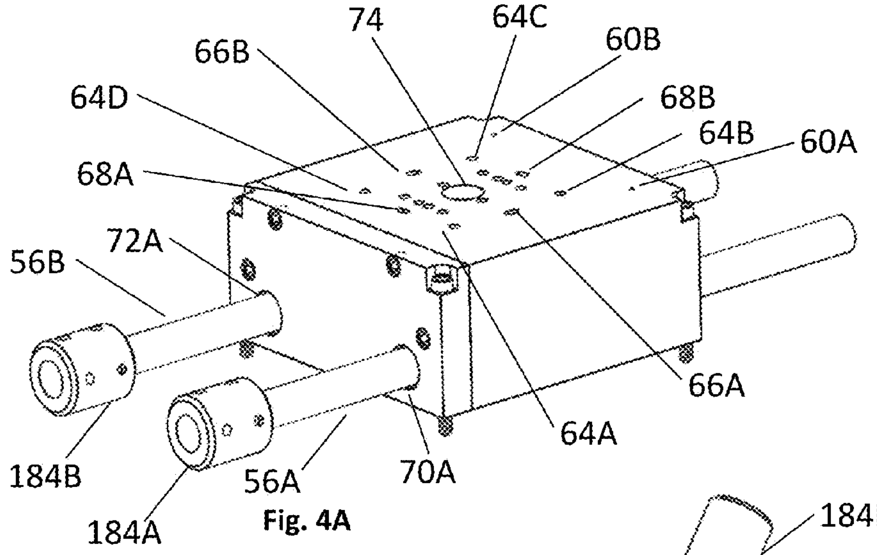
FIGS. 4A-4B are perspective views of the base and sub-rotors of the articulable mast shown in FIGS. 3A-3D.
Figure 4B:
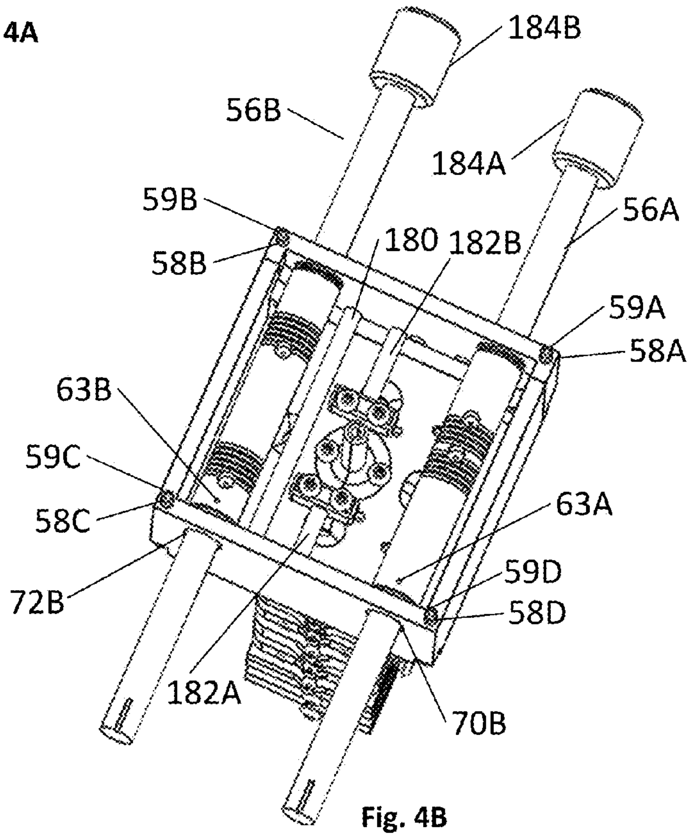
Figure 5A:
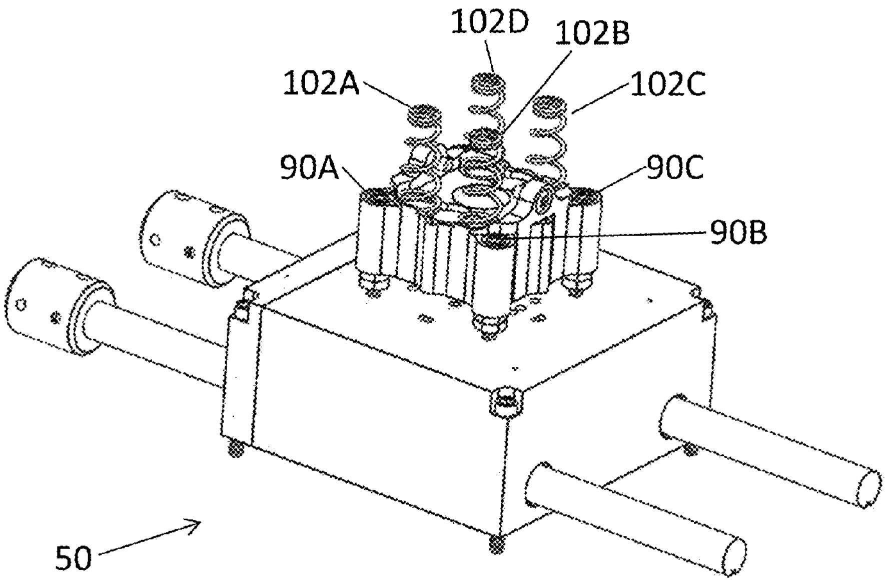
FIGS. 5A-5D respectively are a first perspective view, second perspective view, first side view, and second side view of the fixed link and the base of the articulable mast shown in FIGS. 3A-3D.
Figure 5B:
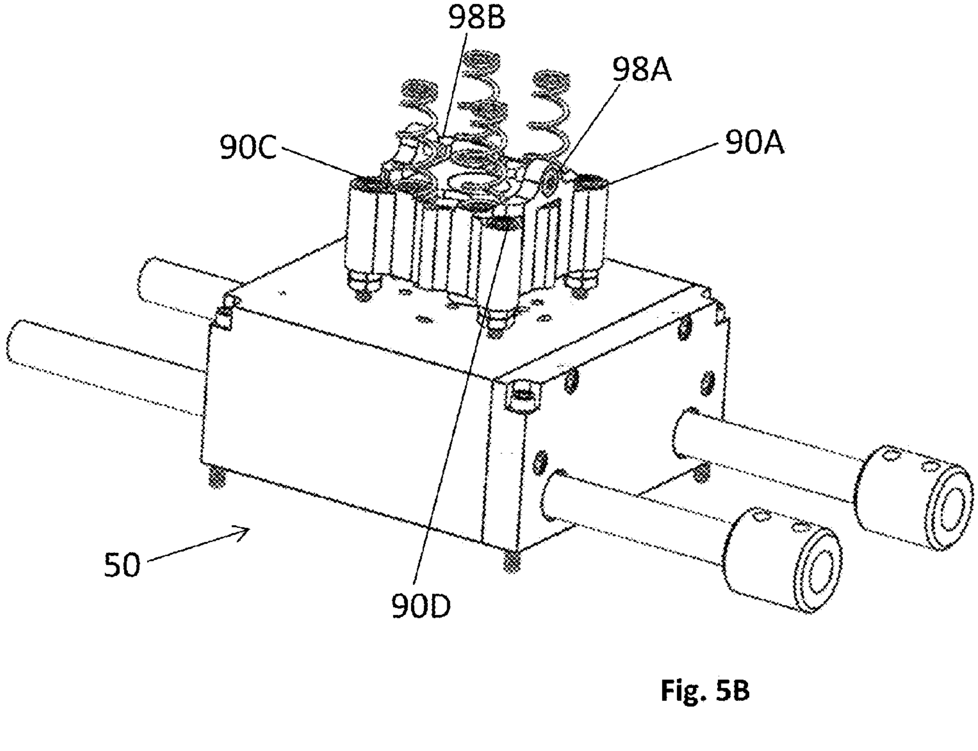
Figure 5C:
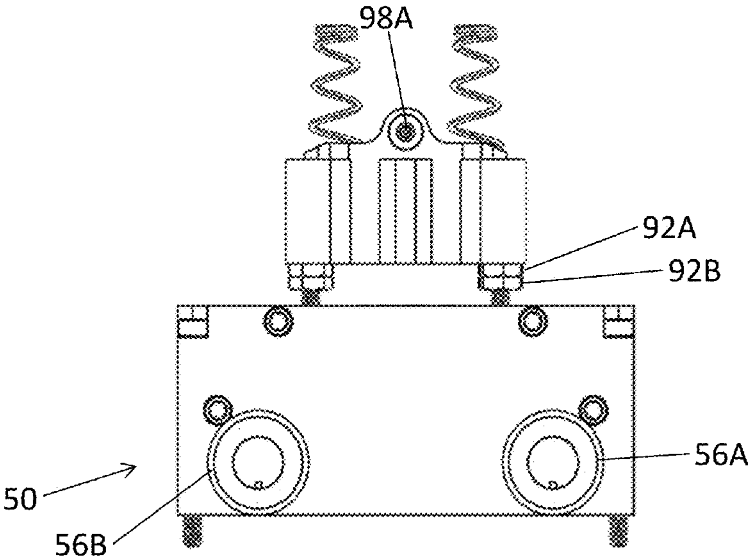
Figure 5D:
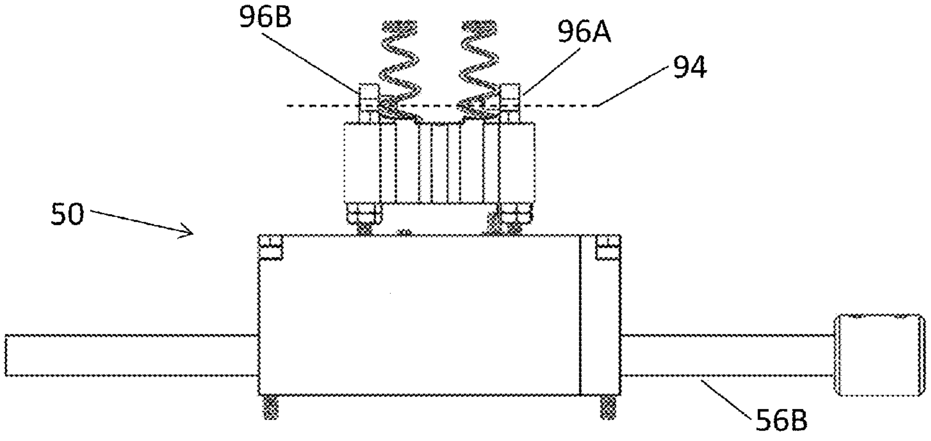

With reference to FIGS. 4A and 4B, the mast base 50 defines four holes 58A-58D that respectively receive screws 59A-59D that are used to attach the mast base 50 to whatever structure the mast array is to be associated (e.g., an aircraft frame). The mast base 50 also defines a pair of holes 60A, 60B that respectively receive pins 62A, 62B (FIG. 3A) that are temporarily used to engage a corresponding pair holes associated with whatever support structure the mast base 50 is to be engaged to align the mast base 50 with the other mast bases in mast array that are or are to be attached to the support structure. The pins 62A, 62B also engage a corresponding pair of holes 63A, 63B associated with the sub-rotors 56A, 56B to temporarily fix the rotational positions of the sub-rotors 56A, 56B relative to the mast base 50 and thereby temporarily fix the linked structure 52 in a defined shape so that all of the articulable masts can be mounted to the support structure with the same starting shape. Typically, the defined shape is with the links of the linked structure aligned with one another such that the linked structure 52 has a columnar shape with a longitudinal axis 65 (FIGS. 3C and 3D). The mast base 50 also defines four tapped holes 64A-64D that receive screws that are used to attached the linked structure 52 to the mast base 50. Also defined by the mast base 50 are two holes 66A, 66B that each receives a portion of the first wire 54A and two holes 68A, 68B that received a portion of the second wire 54B. The mast base 50 also defines two holes 70A, 70B that receive the first sub-rotor 56A and two holes 72A, 72B that receive the second sub-rotor 56B. The holes 70A, 70B and holes 72A, 72B result in the mast base 50 supporting the first and second sub-rotors 56A, 56B such that the longitudinal axes of the sub-rotors are substantially parallel to one another. The mast base 50 further defines a hole 74 for receiving a portion of whatever type of communication conduit is used to convey a signal to and/or from a directional element associated with the articulable mast. For example, if the directional element is an antenna, the communication conduit could be a coaxial cable.

The mast bases 50 of the articulable masts 32 in the mast array 30 collectively form a base for the mast array 30.

The linked structure 52 includes a plurality of links that are pivotally connected to one another. In the illustrated embodiment and with reference to FIG. 3D, the linked structure 52 includes a fixed link 80, a free link 82, and a plurality of intermediate links 84A-84G. The fixed link 80 is fixedly attached to the mast base 50 and pivotally connected to intermediate link 84A. The free link 82 provides a directional element interface 86 for engaging a directional element and is pivotally connected to intermediate link 84G. Each of the intermediate links 84A-84G is pivotally connected to two other links in the linked structure 52.

With reference to FIGS. 5A-5D and 6, the fixed link 80 defines four holes 88A-88D that respectively receive screws 90A-90D and that, in turn, respectively engage the tapped holes 64A-64D associated with the mast base 50 to attach the linked structure to the mast base 50. Associated with each of the screws 90A-90D is a pair of nuts 92A, 92B that cooperate with the screws and the mast base to provide the ability to adjust the position of the fixed link 80 relative to the mast base 50. This adjustment capability can be used to adjust the position of the free link 82 and any attached directional element relative to the mast base 50. However, this adjustment capability is more likely to be used as a tension adjustment structure to adjust the tension in one or both of the first and second wires 54A, 54B.

The fixed link 80 has a pivot axis 94 that is defined by a pair of holes 96A, 96B which respectively receive pins 98A, 98B that also engage a corresponding pair of holes associated with the intermediate link 84A to pivotally connect the fixed link 80 and the intermediate link 84A.

Figure 6:
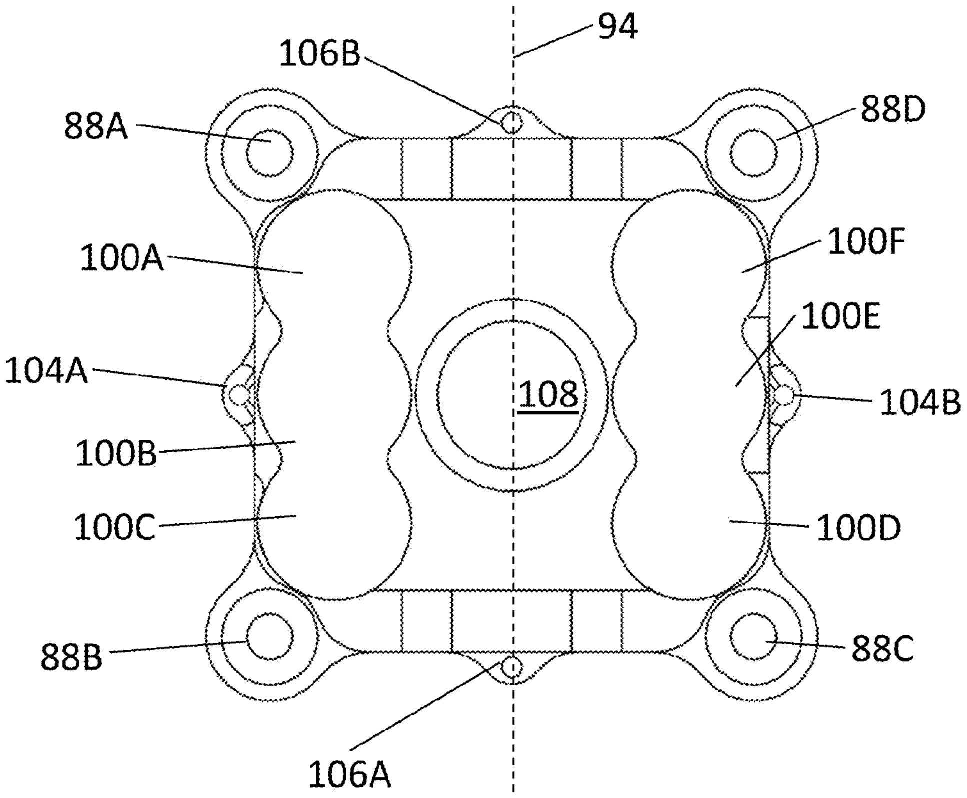
FIG. 6 is a plan view of the fixed link of the articulable mast shown in FIGS. 3A-3D.
Figure 7A:
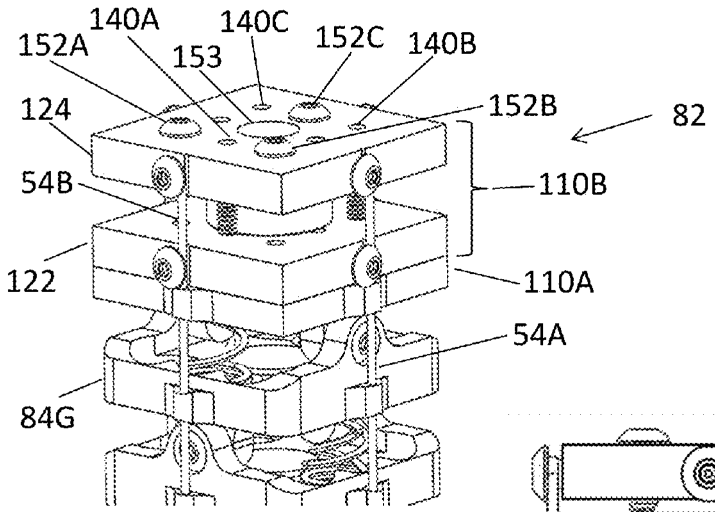
FIGS. 7A-7C respectively are a perspective view, first side view, and second side view of the free link and the intermediate link that is pivotally connect to the free link of the articulable mast shown in FIGS. 3A-3D.
Figure 7B:
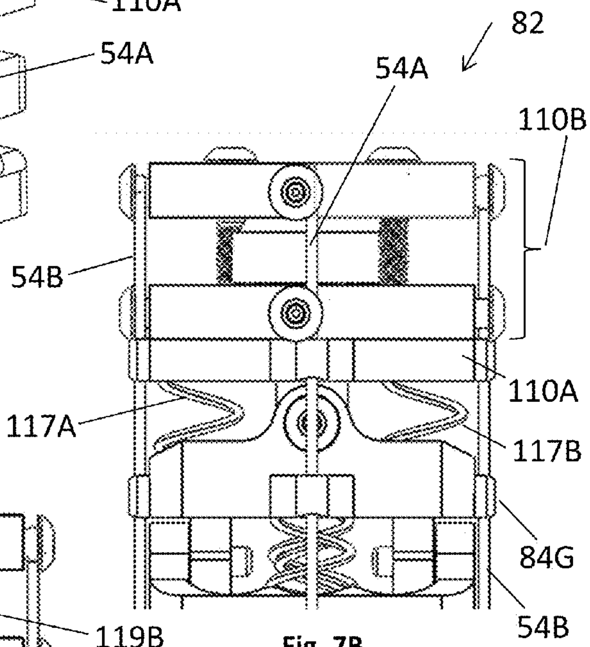
Figure 7C:
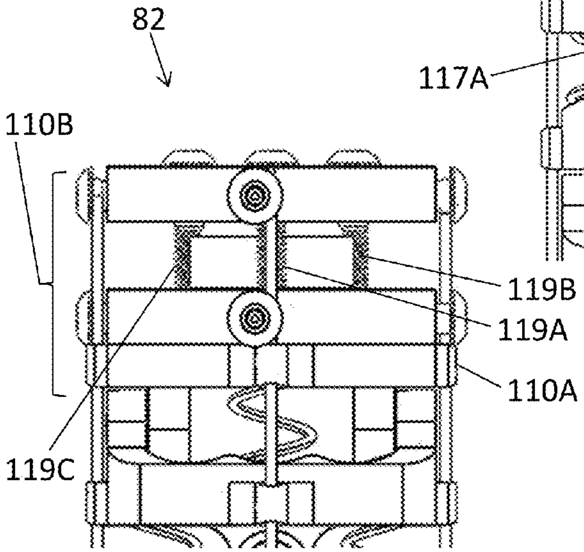
Figure 8:
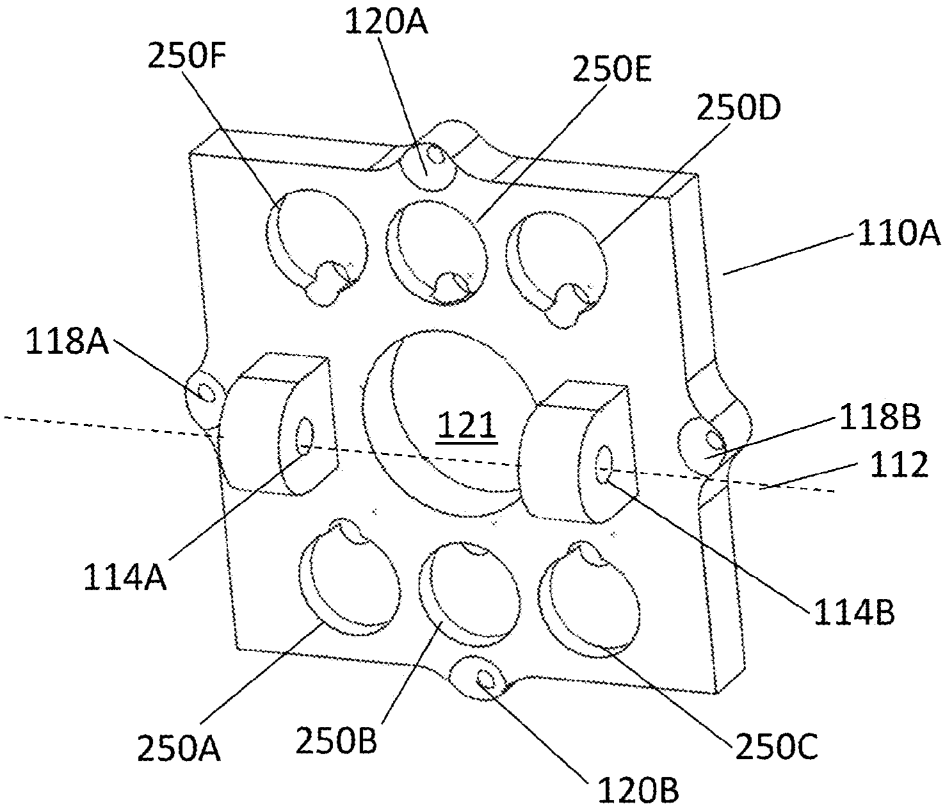
FIG. 8 is a perspective view of the free link of the articulable mast shown in FIGS. 3A-3D.

With reference to FIG. 6, the fixed link 80 also includes spring seats 100A-100F, each of which is capable of engaging one end of a conical spring that produces a moment force between the fixed link 80 and the intermediate link 84A relative to the pivot axis 94. The plurality of spring seats allows for adjustment of the number of conical springs associated with the fixed link 80 and the moment forces between the links. Typically, pairs of conical springs are employed that are capable of producing opposing moment forces relative to the pivot axis 94. In the illustrated embodiment, four conical springs 102A-102D (i.e., two pairs of conical springs) are employed. Conical springs are employed to increase the angle through which the intermediate link 84A can move relative to a cylindrical spring and thereby require fewer links in the linked structure to achieve a desired range of motion. To elaborate, the loops of a conical spring nest within one another as the spring is compressed. In contrast, the loops of a cylindrical spring do not nest or bind with one another when the spring is compressed beyond a certain point. As such, the ends of a conical spring can be brought closer together when the spring is compressed than the ends of a comparable cylindrical spring.

The fixed link 80 also defines a pair of slots 104A, 104B that each receives a portion of the first wire 54A and a second pair of slots 106A, 106B that each receives a portion of the second wire 54B. Also defined by the fixed link 50 is a hole 108 for receiving a portion of whatever type of communication conduit is used to convey a signal to or from a directional element associated with an articulable mast.

With reference to FIGS. 7A-7C and 8, the free link 82 comprises a first portion 110A and a second portion 110B. The first portion 110A includes a pivot axis 112 that is defined by a pair of holes 114A, 114B which respectively receive pins 116A, 116B (FIGS. 3A and 3B) that also engage a corresponding pair of holes associated with the intermediate link 84G to pivotally connect the free link 82 and the intermediate link 84G.

The first portion 110A also includes six spring seats 250A-250F each of which is capable of engaging one end of a conical spring that produces a moment force between the free link 82 and the intermediate link 84G relative to the pivot axis 112. In the illustrated embodiment, a single pair of conical springs 117A, 117B extends between the free link 82 and the intermediate link 84G. The pair of conical springs 117A, 117B is capable of producing opposing moment forces relative to the pivot axis 112.

The first portion 110A also includes three tapped holes that respectively receive three set screws 119A-119C that are used to attach the first portion 110A and the second portion 110B. The first portion 110A also defines a pair of slots 118A, 118B that each receives a portion of the first wire 54A and a second pair of slots 120A, 120B that each receives a portion of the second wire 54B. Also defined by the first portion 110A is a hole 121 for receiving a portion of whatever type of communication conduit is used to convey a signal to and/or from a directional element associated with an articulable mast.

The second portion 110B engages the first portion 110A, provides an interface for engaging a directional element, and provides a position adjustment structure for changing the position of a directional element. The second portion 110B includes a first member 122, a second member 124, and a bearing 126 that separates the first member 122 and second member 124.

Figure 9A:
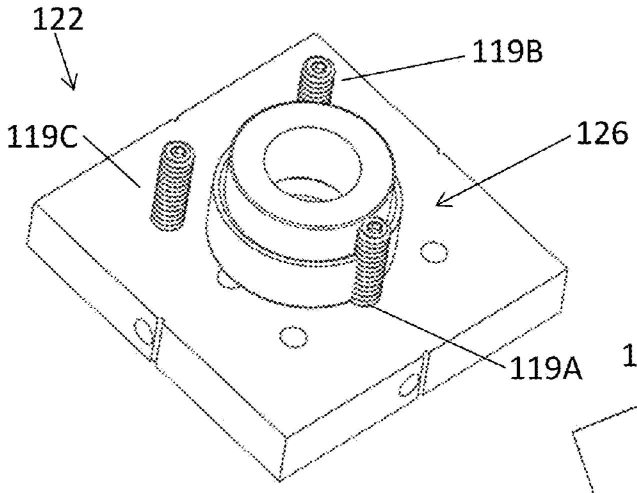
FIGS. 9A-9C are three perspective views of a portion of the free link of the articulable mast shown in FIGS. 3A-3D.
Figure 9B:
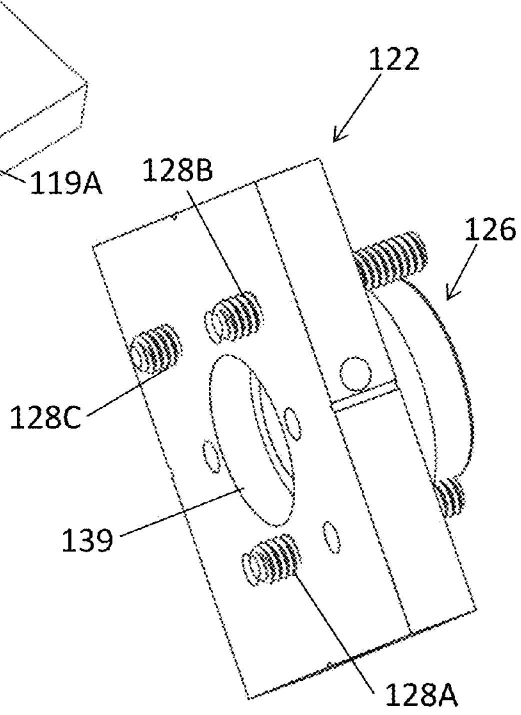
Figure 9C:
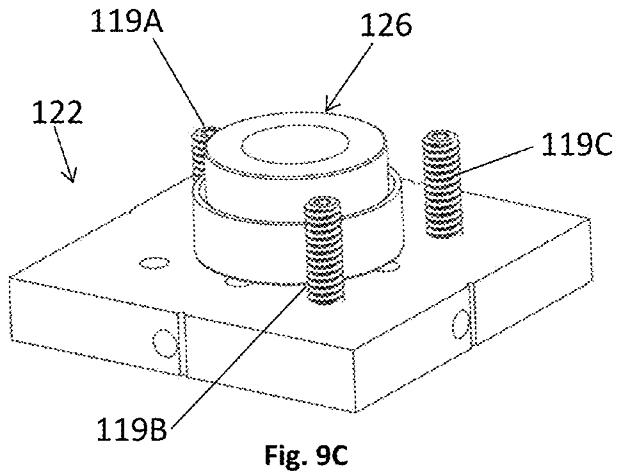
Figure 10A:
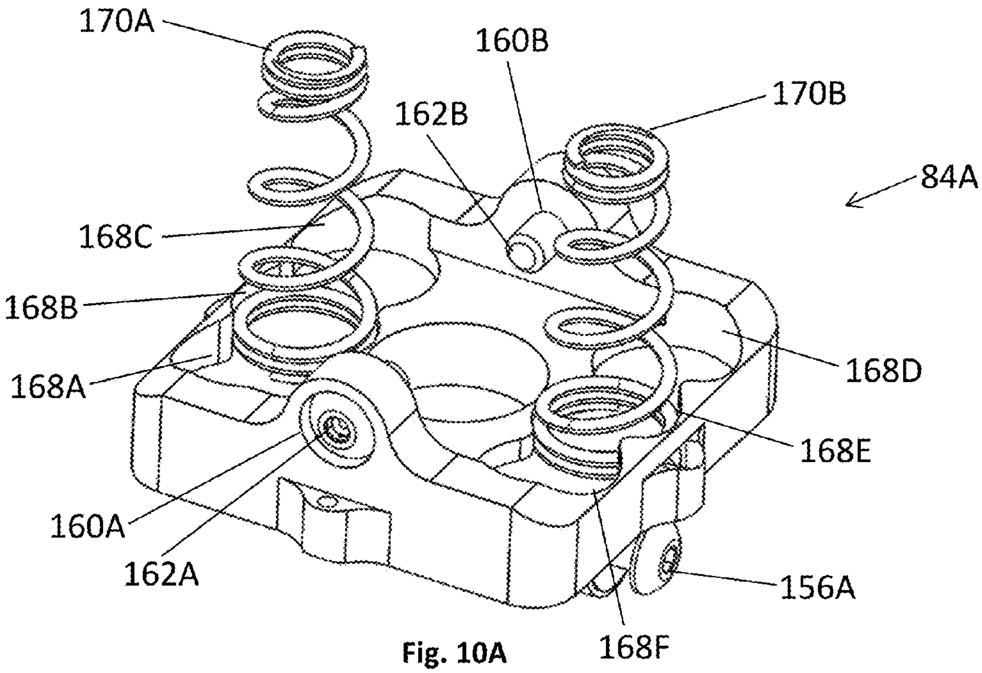
FIGS. 10A-10D respectively are a first perspective view, first side view, second side view, and second perspective view of an intermediate link of the articulable mast shown in FIGS. 3A-3D.
Figure 10B:
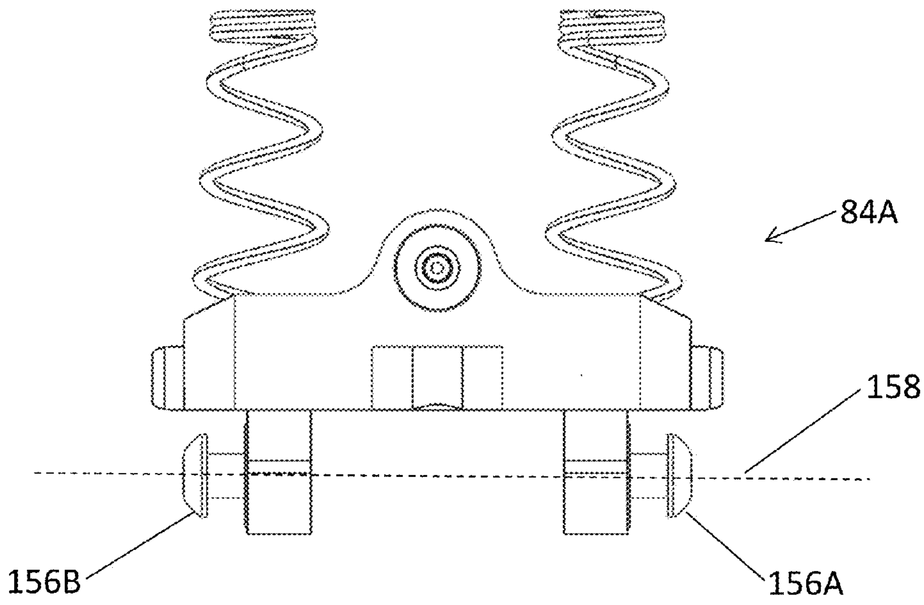
Figure 10C:
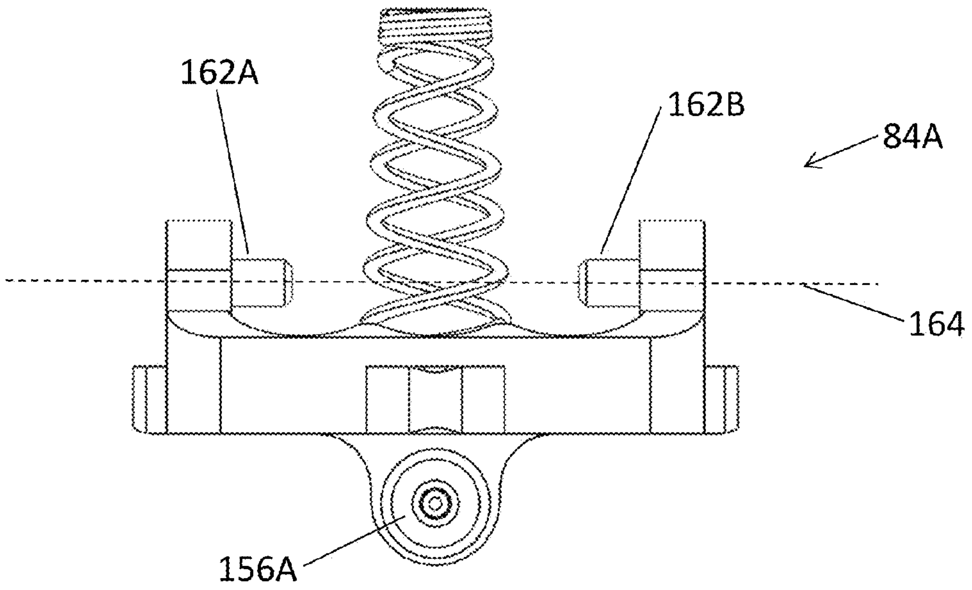
Figure 10D:
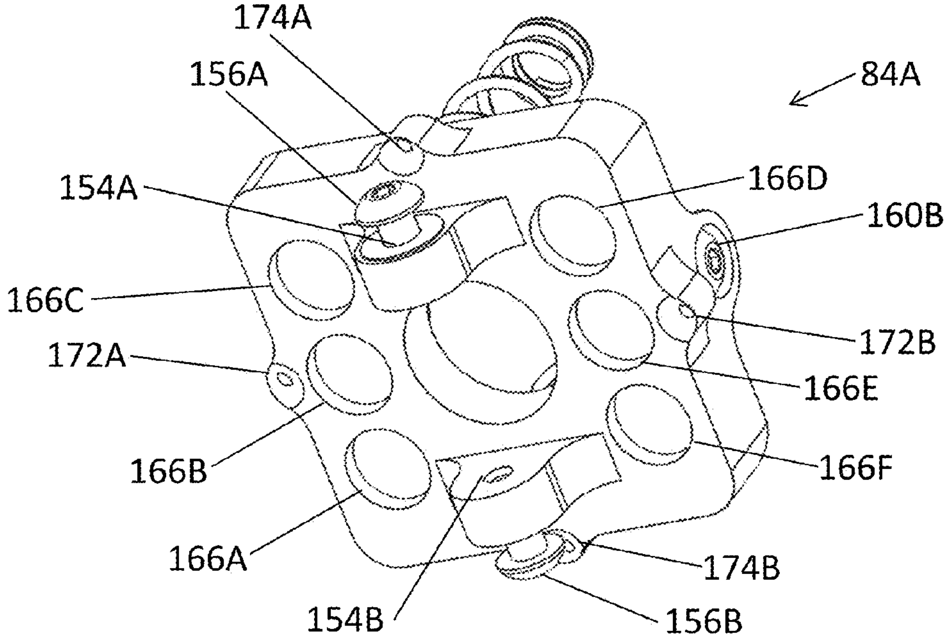

With reference to FIGS. 9A-9C, the first member 122 includes holes 128A-128C that cooperate with set screws 119A-119C that are used connect the first member 122 and the second member 124. The set screws 119A-119C also cooperate with the tapped holes associated first portion 110A to connect the first and second portions 110A, 110B. The first member 122 also includes holes that cooperate with screws 134A, 134B (FIGS. 3A and 3B) to fixedly attach a portion of the first wire 54A to the first member 122. The first member 122 also includes holes that cooperate with screws 138A, 138B (FIGS. 3A and 3B) to fixedly attach a portion of the second wire 54B to the first member 122. Also defined by the first member 122 is a hole 139 for receiving a portion of whatever type of communication conduit is used to convey a signal to and/or from a directional element associated with an articulable mast.

The second member 124 defines holes 140A-140C that respectively receive the set screws 119A-119C that are used to connect the second member 124 and the first member 122 and to connect second portion 110B and the first portion 110A. The second member 124 also includes holes that cooperate with screws 144A, 144B (FIGS. 3A and 3B) to fixedly attach a portion of the first wire 54A to the second member 124. The second member 124 also includes holes that cooperate with screws 148A, 148B (FIGS. 3A and 3B) to fixedly attach a portion of the second wire 54B to the second member 124. The second member 124 also defines holes that cooperate with screws 152A-152C to form a directional element interface for attaching a directional element to the free link 82. Also defined by the second member 124 is a hole 153 for receiving a portion of whatever type of communication conduit is used to convey a signal to and/or from a directional element associated with an articulable mast.

The bearing 126 separates the first member 122 and the second member 124 from one another and cooperates with the set screws 119A-119C and associated holes of the first member 122 and the second member 124 to allow the user to adjust the position of the first member 122 relative to the second member 124 and thereby adjust the position of any directional element associated with the free link 82. To elaborate, if the boresight associated of a directional element attached to the free link 82 is not properly oriented, one or more of the set screws 119A-119C can be adjusted to adjust the orientation of the second member 124 relative to the first member 122. Also defined by the bearing 126 is a hole for receiving a portion of whatever type of communication conduit is used to convey a signal to and/or from a directional element associated with the articulable mast.

The intermediate links 84A-84G are substantially identical to one another. Consequently, only intermediate link 84A will be described in detail. The intermediate link 84A defines a first pair of holes 154A, 154B that respectively receive a first pair of pins 156A, 156B that define a first axis of rotation 158 between the link 84A and the fixed link 80. The intermediate link 84A also defines a second pair of holes 160A, 160B that respectively receive a second pair of pins 162A, 162B that define a second axis of rotation 164 between the link 84A and the link 84B. The first and second axes 158, 164 of rotation are substantially orthogonal to one another. This orthogonality facilitates the positioning of the boresight of any directional element attached to the free link 82 so as to be collinear with or parallel to a radius of a spherical section.

Associated with the link 84A are spring seats 166A-166F, each of which is capable of engaging one end of one of the conical springs associated with the fixed link 80 to produce a moment force relative to the first axis of rotation 158, which for link 84A is the same as pivot axis 94. In the illustrated embodiment, spring seats 166A, 166C, 166D, and 166F each respectively accommodate an end of the springs 100A-100D associated with the fixed link 80.

Also associated with the link 84A are spring seats 168A-168F, each of which is capable of engaging one end of one of up to six conical springs that can be associated with the link 84A and are used to produce a moment force relative to the second axis of rotation 164. In the illustrated embodiment, the link 84A includes a single pair of conical springs 170A, 170B.

The link 84A also defines a pair of slots 172A, 172B that each receives a portion of the first wire 54A and a second pair of slots 174A, 174B that each receives a portion of the second wire 54B.

The first wire 54A extends from a first end that is fixedly attached to the free link 82 using screws 134A and 144A to a second end that is fixedly attached to the free link 82 using screws 134B, 144B. The portions of the first wire 54A located between the first and second ends pass through the slot 118A associated with the first portion 110A of the free link 82, through the slots 172A associated with each of the intermediate links 84A-84G, through the slot 104A associated with the fixed link 80, the through the hole 66A associated with the mast base 50, into an engagement with the first sub-rotor 56A, through the hole 66B associated with the mast base 50, through the slot 104B associated with the fixed link 80, through the slots 172B associated with each of the intermediate links 84A-84G, and through the slot 118B associated with the first portion 110A of the free link 82.

The second wire 54B extends from a first end that is fixedly attached to the free link 82 using screws 138A, 148A to a second end that is fixedly attached to the free link 82 using screws 138B, 148B. The portions of the second wire 54B located between the first and second ends pass through the slot 120A associated with the first portion 110A of the free link 82, through the slots 174A associated with each of the intermediate links 84A-84G, through the slot 106A associated with the fixed link 80, the through the hole 68A associated with the mast base 50, into an engagement with the second sub-rotor 56B, through the hole 68B associated with the mast base 50, through the slot 106B associated with the fixed link 80, through the slots 174B associated with each of the intermediate links 84A-84G, and through the slot 120B associated with the first portion 110A of the free link 82.

The first sub-rotor 56A and the first wire 54A are engaged by wrapping the first wire 54A around the first sub-rotor 56A such that there is little, if any, slippage between the wire and the rotor during rotation of the rotor. As such, rotation of the first sub-rotor 56A in one direction (e.g., clockwise) draws one of the two ends of the first wire 54A towards the rotor and allows the other end of the wire to be pulled away from the rotor. Rotation of the first sub-rotor 56A in the other direction (e.g., counter-clockwise) draws the other of the two ends of the first wire 54A towards the rotor and allow the other end of the wire to be pulled away the rotor. The second sub-rotor 56B and the second wire 54B are engaged by wrapping the second wire 54A around the second sub-rotor 56B such that there is little, if any, slippage between the wire and the rotor during rotation of the rotor. As such, rotation of the second sub-rotor 56B in one direction (e.g., clockwise) draws one of the two ends of the second wire 54B towards the rotor and allows the other end of the wire to be pulled away from the rotor. Rotation of the second sub-rotor 56A in the other direction (e.g., counter-clockwise) draws the other of the two ends of the second wire 54B towards the rotor and allow the other end of the wire to be pulled away the rotor.

Figure 11:
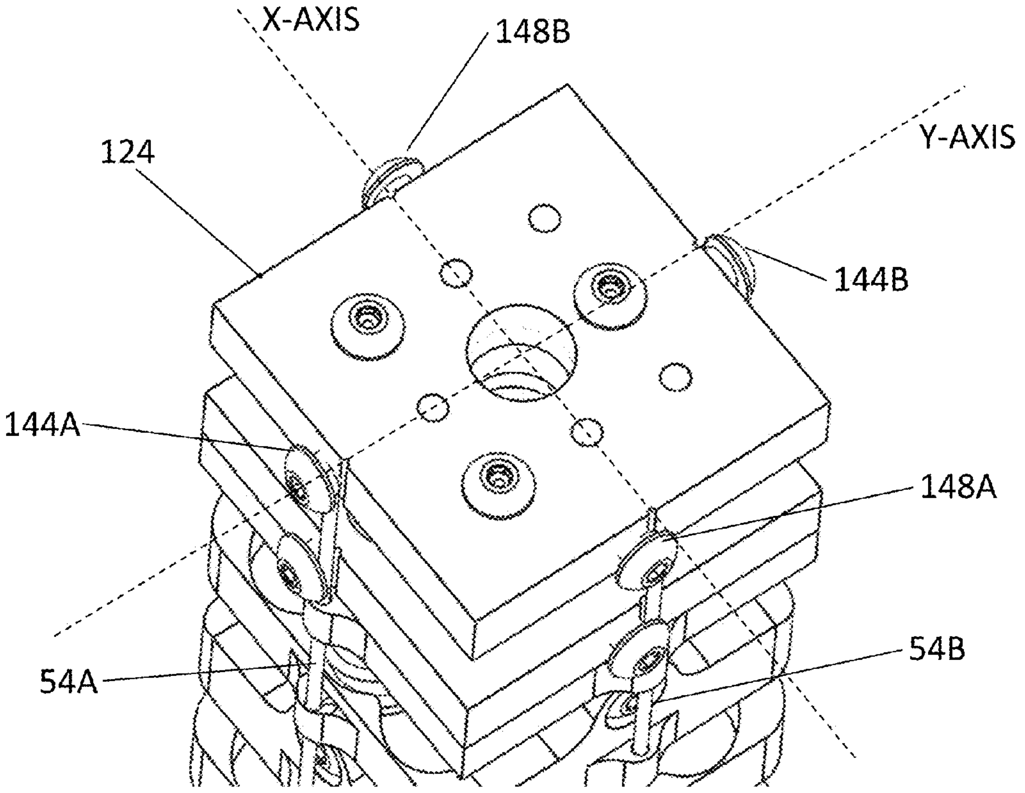
FIG. 11 is a perspective view of the second member of the free link of the articulable mast shown in FIGS. 3A-3D.

Relatedly and with reference to FIG. 11, if the screws 148A, 148B associated with the second member 124 of the free link 82 define an x-axis and the screws 144A, 144B associated with the second member 124 of the free link 82 define y-axis, rotation of the first sub-rotor 56A causes the second member 124 (and any attached directional element) to rotate about the x-axis and rotation of the second sub-rotor 56B cause the second member 124 to rotate about the y-axis.

With reference to FIG. 4B, associated with the first sub-rotor 56A is a bar 180 that facilitates the directional change of the first wire 54A between the hole 66A and the rotor and prevents the edge of the hole from abrading the wire. Bars 182A, 182B respectively facilitate the directional changes of the second wire 54B between the holes 68A, 68B and the rotor and prevent the edges of the holes from abrading the wire. The bar 180 and pair of bars 182A, 182B are particularly useful when the wires are subject to a relatively high tension. In situations in which the wires are under less tension, the bars may not be needed. Further, there are alternatives to the bars, including counter-sinking or other similar treatments of the holes that increase the radius of the turn that a wire makes between a hole and a sub-rotor.

With reference to FIGS. 4A and 4B, respectively associated with the first and second sub-rotors 56A, 56B are first and second connectors 184A, 184B. The connectors 184A, 184B are used to connect the first and second sub-rotors 56A, 56B of one articulable mast 32 to the corresponding first and second sub-rotors of an adjacent articulable mast 32 to realize a rotor structure in which the two, first sub-rotors of the two articulable masts form a first rotor and the two, second sub-rotors of the two masts from a second rotor. In the illustrated embodiment, the connectors 184A, 184B are sleeves. The sleeves each engage two corresponding sub-rotors such that the rotor formed by the connection of the two sub-rotors is relatively rigid and linear. Due to the relatively rigid characteristic of the rotor, rotation of the rotor produces the substantially the same effect in both of the articulable masts. It should be appreciated that several other types of connectors are capable of connecting two rotors with aligned longitudinal axes are known to those skilled in the art, including but not limited to U-joints, limited slip bellows, and flexible drive shafts.

It should be appreciate that a single-piece rotor can be used in place of a rotor comprised of connected sub-rotors. Relatedly, the two more mast bases of adjacent articulable masts that are connected by such a single-piece rotor can be replaced with a single-piece. However, either of these modifications reduces the modularity of the resulting array, which may be undesirable in certain circumstances.

The ability to connect the corresponding sub-rotors of two articulable masts with sleeves can be extended so as to connect the corresponding sub-rotors of more than two articulable masts to realize a one-dimensional and linear array of masts. For example and with reference to FIGS. 1A and 1B, the mast array 30 is comprised of four linear sub-arrays of articulable masts 200A-200D with each of the four linear sub-arrays comprised of four articulable masts 202A-200D and a rotor structure 204. The rotor structure 204 is comprised of a first rotor 206A formed by the connection of the corresponding first sub-rotors of each of the four articulable masts and a second rotor 206B formed by the connection of the corresponding second sub-rotors of each of the four articulable masts. To impart the same rotation to each of the first rotors 206A and second rotors 206B associated with each of the four linear sub-array of articulable mast 200A-200D, the first rotors 206A and second rotors 206B of each of the linear sub-arrays 200A-200D are synchronously driven. For example, the rotational forces provided by a first motor can be transmitted to each of the first rotors 206A associated with the four linear sub-array of articulable mast 200A-200D by a system of gears such that the rotation of motor's rotor and the direction of rotation of the motor's rotor results in a corresponding rotation and direction of rotation that is substantially the same in each of the first rotors 206A. A second motor and system of gears would operate in substantially the same fashion with respect to the second rotors 206B associated with the four linear sub-array of articulable mast 200A-200D. It should be appreciated that there numerous structures known to those skilled in the art that are capable of transmitting the rotational forces of a motor to a plurality of rotors, including gear systems, gear systems that employ one or more timing chains, pulley and belts system, and rack and pinion systems to name a few. Also feasible are transmission systems that impart synchronized rotational forces to the rotors from motors that linearly displace a portion of the motor using electrical, hydraulic, or pneumatic forces.

Figure 12:
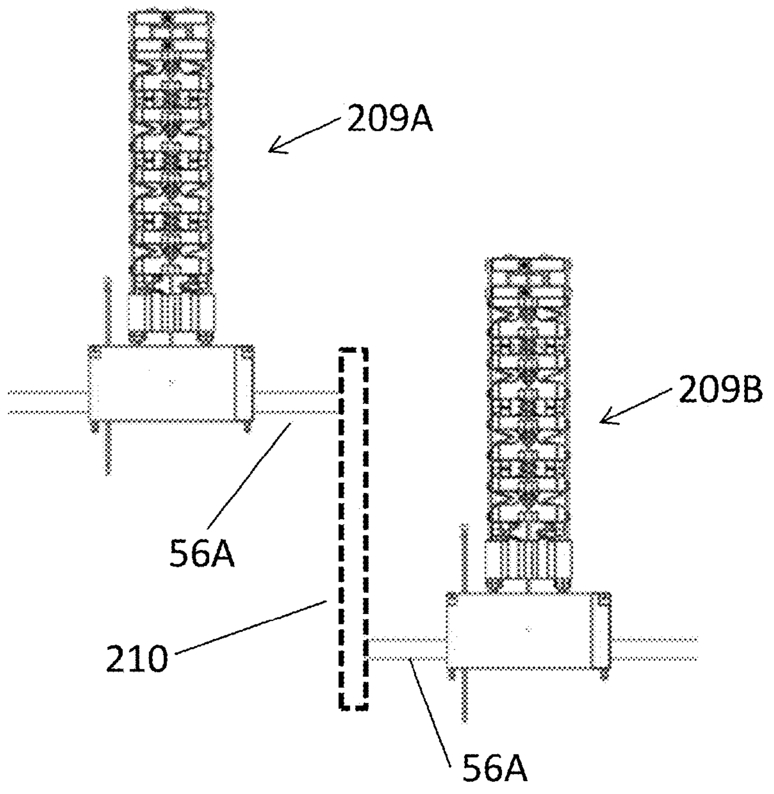
FIG. 12 is a side view of two articulable masts of the type shown in FIGS. 3A-3D in which corresponding sub-rotors associated with two masts are parallel to but not collinear with one another but connected to one another.

With reference to FIG. 12, the first and second sub-rotors 56A, 56B of two adjacent articulable masts 209A, 209B can also be connected to one another when the corresponding sub-rotors of the two masts are parallel but not collinear with one another. In this case, a connector 210 is provided that extends between each pair of corresponding sub-rotors such that the sub-rotors and the connector 210 form a rotor structure that operates such that rotation of the corresponding sub-rotors is synchronized. The connector 210 can take any of a number of forms known to those skilled in the art, including a first gear associated with one of the sub-rotors, a second gear associated with the other sub-rotor, and the first and second gears directly engaging one another or engaging one another via a chain. Another of the many possibilities is a first pulley associated with one of the sub-rotors, a second pulley associated with the other sub-rotor, and a belt engaging the two pulleys. The ability to connect the corresponding pairs of sub-rotors of two adjacent articular masts 32 with the connector 210 can be extended such that additional connectors are employed to connect the corresponding pairs of sub-rotors associated with additional adjacent pairs of articulable masts 32.

If the spacing between each of the adjacent pairs of articulable masts is the same or there is only one adjacent pair of articulable masts in the array, a linear-step-wise mast array can be realized, i.e., an array in which a straight line passes through corresponding points associated with each of the articulable masts 32 in the array and the sub-rotors of each articulable mast 32 in the array are parallel to but not collinear with the sub-rotors of every other articulable mast in the array.

If the spacing between each of the adjacent pairs of masts is not the same and there are three or more articulable masts in the array, a curved-step-wise mast array can be realized, i.e., an array in which a line that passes through corresponding points associated with each of the articulable masts 32 in the array is not a straight line and the sub-rotors of at least one adjacent pairs of articulable masts are parallel to but not collinear with one another.

Figure 13:
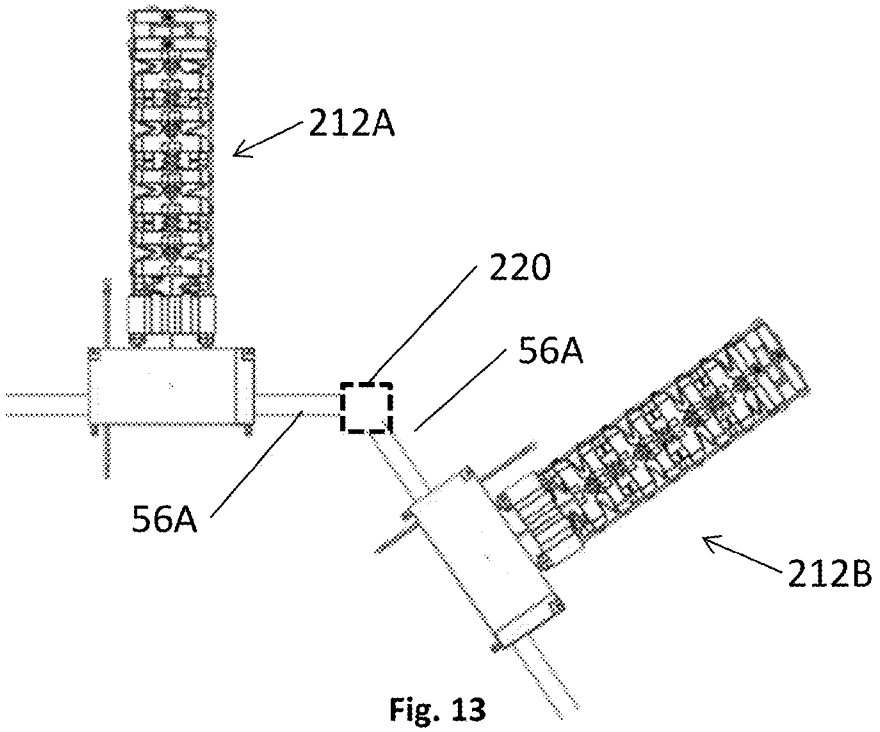
FIG. 13 is a side view of two articulable masts of the type shown in FIGS. 3A-3D in which corresponding sub-rotors associated with the two masts are not parallel and not collinear with one another but have intersecting longitudinal axes and are connected to one another by a connector.

With reference to FIG. 13, the first and second sub-rotors 56A, 56B of two adjacent articulable masts 212A, 212B can also be connected to one another when the corresponding pairs of sub-rotors of the two masts are non-parallel, not collinear, but have intersecting longitudinal axes. To elaborate, the connectors 184A, 184B and the connector 210 are used to connect corresponding pairs of sub-rotors of adjacent articulable masts 32 when each of the articulable masts is oriented so that the longitudinal axes of the linked structures 52 of the articulable masts are substantially parallel to one another. When the longitudinal axes of the linked structures of two adjacent articulable masts are not parallel to one another, the corresponding sub-rotors of the masts are non-parallel and non-collinear. However, provided the longitudinal axes of the corresponding sub-rotors intersect, a connector 220 can be employed to connect the corresponding pairs of sub-rotors such that the sub-rotors and the connector 220 form a rotor structure that operates such that rotation of the corresponding sub-rotors is synchronized. The connector 220 can take any of a number of forms known to those skilled in the art, including a first bevel gear that is associated with one of the sub-rotors and a second bevel gear the is associated with the other sub-rotor and directly engages the first bevel gear. Among the many other possibilities are face gears and universal joints.

Figure 14A:
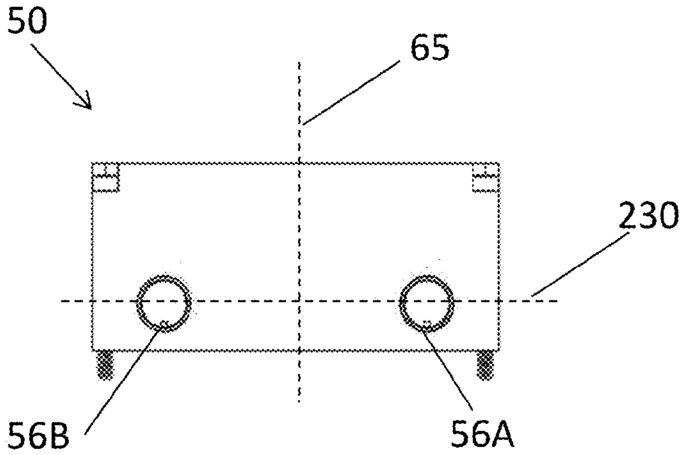
FIGS. 14A and 14B respectively are an end view and a plan view of the mast base and the sub-rotors of the articulable mast shown in FIGS. 3A-3D.
Figure 14B:
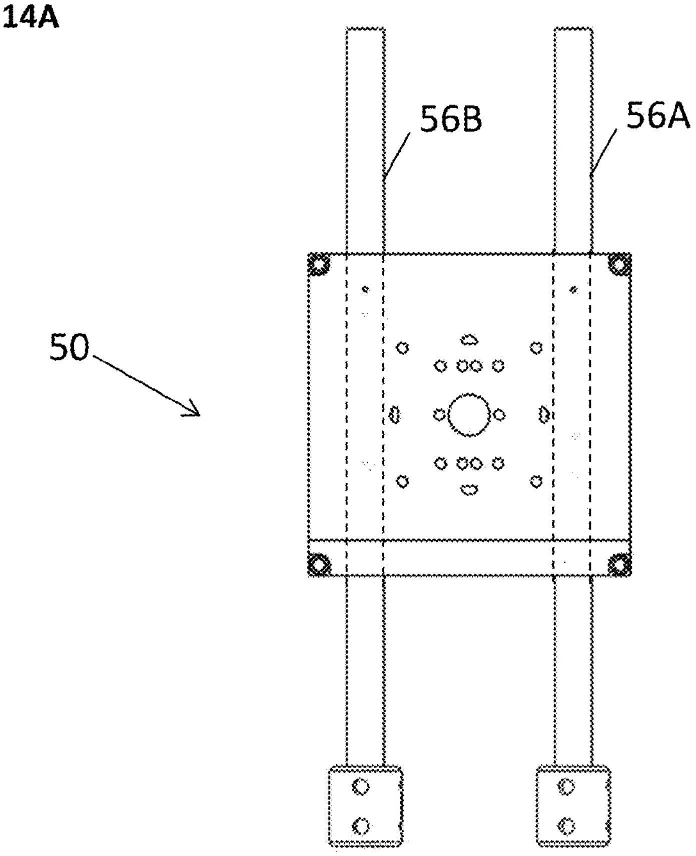

With reference to FIGS. 14A and 14B, the sub-rotors 56A, 56B of the articulable mast 32 are substantially parallel to one another and lie in a rotor plane 230 that is substantially perpendicular to the longitudinal axis 65 of the linked structure 52. The sub-rotors 56A, 56B can be disposed in other orientations that may, among other possibilities, facilitate the connection of the sub-rotors to the corresponding sub-rotors of an adjacent mast 32 to realize a particular 2-D or 3-D mast array or accommodate other componentry associated with the mast array or associated with the structure with which the mast array is to be associated.

Figure 15A:
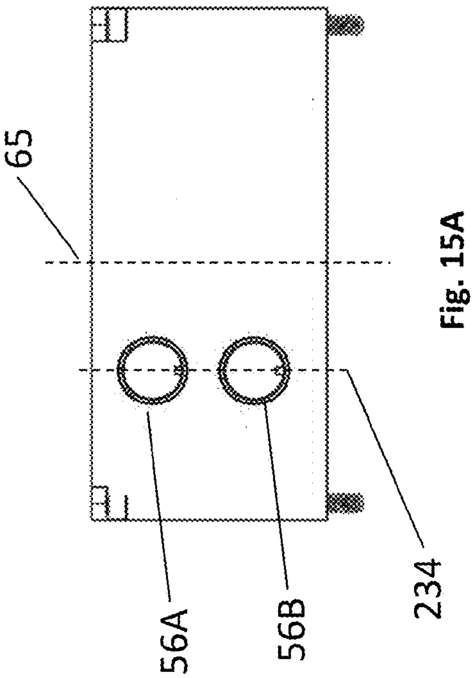
FIGS. 15A and 15B respectively are an end view and a side view of a second embodiment of a mast base and sub-rotors for an articulable mast of the type shown in FIGS. 3A-3D.
Figure 15B:
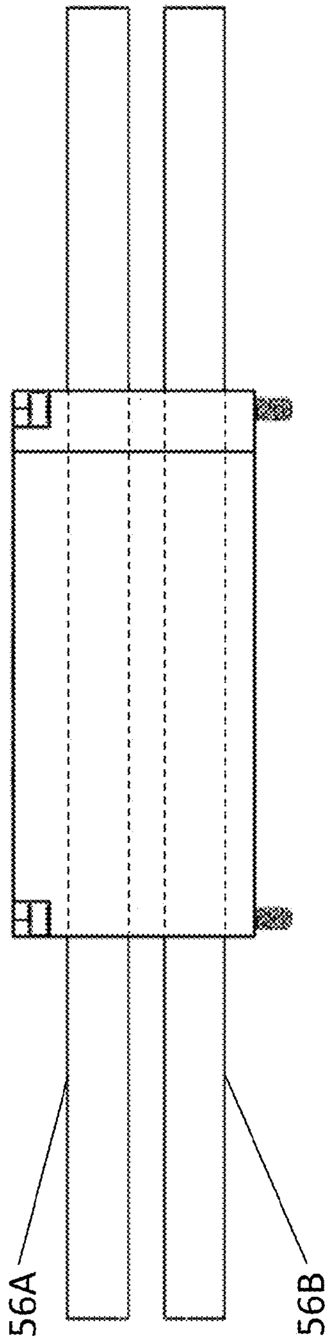

With reference to FIG. 15A-15B, the sub-rotors 56A, 56B can be disposed to lie in a rotor plane 232 that is parallel to or coincident with the longitudinal axis 65 of the linked structure and the sub-rotors 56A, 56B are parallel to one another.

Figure 16A:
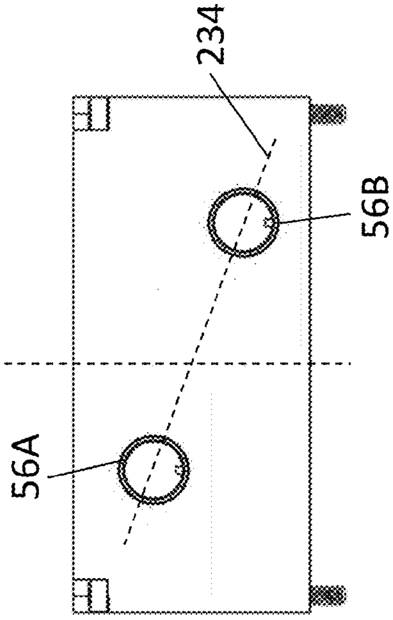
FIGS. 16A-16C respectively are an end view, plan view, and a side view of a third embodiment of a mast base and sub-rotors for an articulable mast of the type shown in FIGS. 3A-3D.
Figure 16C:
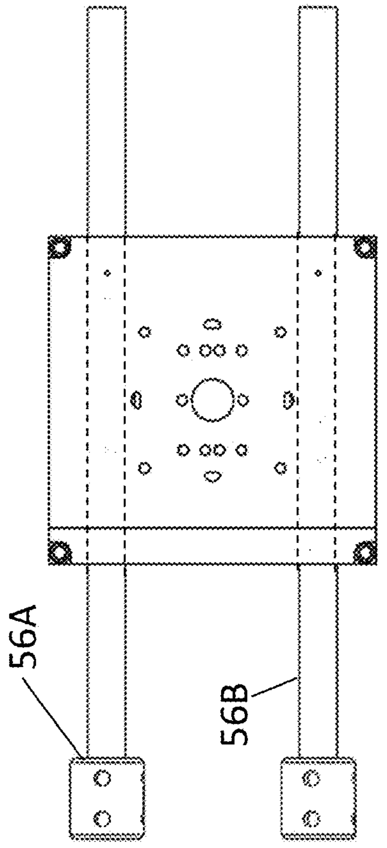
Figure 16B:
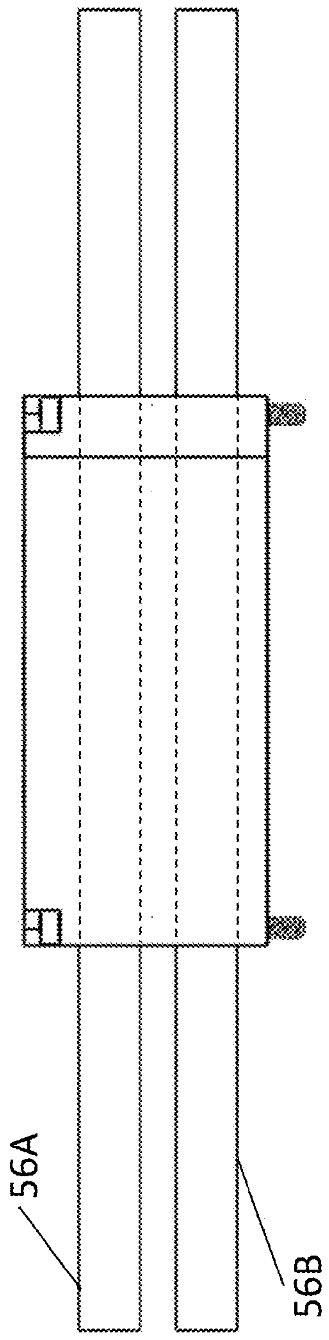

With reference to FIG. 16A-16C, the sub-rotors 56A, 56B can be disposed to lie in a rotor plane 234 that is not perpendicular to the longitudinal axis 65 of the linked structure and not parallel to or coincident with the longitudinal axis 65 of the linked structure.

Figure 17A:
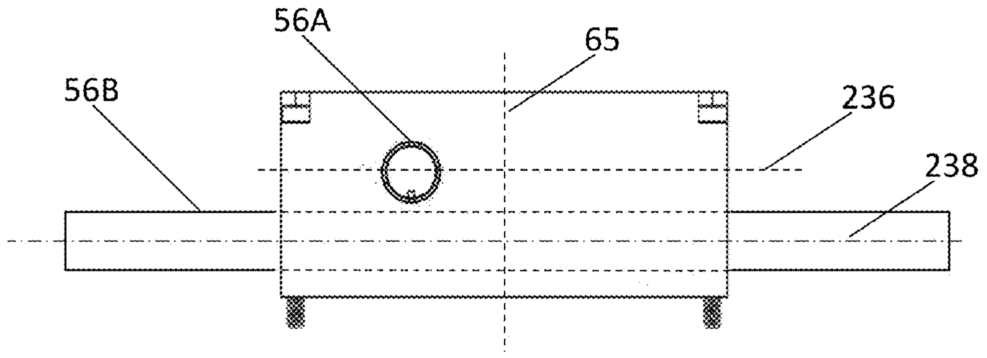
FIGS. 17A-17B respectively are an end view and a plan view of a fourth embodiment of a mast base and sub-rotors for an articulable mast of the type shown in FIGS. 3A-3D.
Figure 17B:
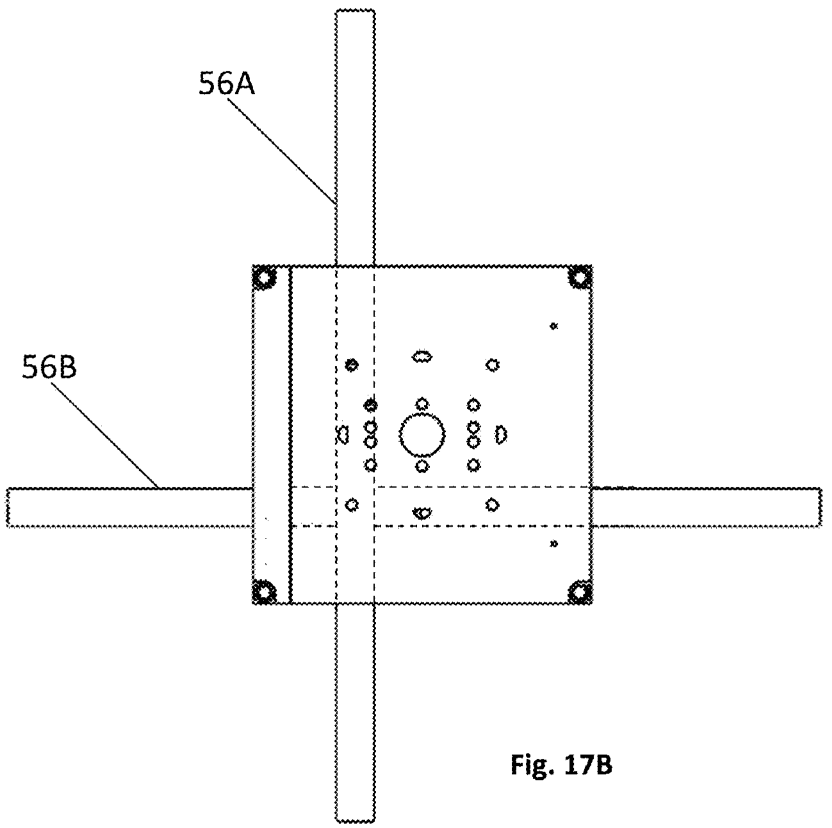

With reference to FIGS. 17A and 17B, the sub-rotors 56A, 56B are respectively located in separate planes that are each perpendicular to the longitudinal axis 65 of the linked structure but the longitudinal axes of the sub-rotors 56A, 56B are not parallel to one another. In the illustrated embodiment, the longitudinal axes of the sub-rotors 56A, 56B are orthogonal to one another.

The foregoing description of the invention is intended to explain the best mode known of practicing the invention and to enable others skilled in the art to utilize the invention in various embodiments and with the various modifications required by their particular applications or uses of the invention.

What is claimed is:

1. An array of articulable masts for use with an array of directional elements, comprising:

a base;

a plurality of linked structures with each linked structure comprising a plurality of links including:

a fixed terminal link that defines a first terminal end of the linked structure;

a free terminal link that defines a second terminal end of the linked structure;

wherein each of the fixed and free terminal links is pivotally connected to only one link of the plurality of links;

wherein each of any intermediate links located between the fixed and free terminal links is pivotally connected to two other links of the plurality of links;

wherein the fixed terminal link is operatively connected to the base such that the position of the fixed terminal link is substantially fixed relative to the base;

wherein the free terminal link provides a directional element interface for operatively engaging a directional element structure with a boresight and is capable of being moved relative to the fixed terminal link to reposition the boresight of a directional element structure attached to the directional element interface;

wherein, when the plurality of links are aligned with one another, the linked structure has a linked structure longitudinal axis;

a plurality of wires, each wire of the plurality of wires operatively engages one of the plurality of linked structures; and a rotor structure for engaging corresponding wires associated with the plurality of linked structures;

wherein actuation of the rotor structure moves the wires associated with the plurality of linked structures to change the position of the free terminal links of each of the linked structures and the boresights of any related directional element structures.

2. An array of articulable masts, as claimed in claim 1, wherein:

the rotor structure comprises a single-piece rotor that engages wires associated with at least two linked structures of the plurality of linked structures.

3. An array of articulable masts, as claimed in claim 1, wherein:

the rotor structure comprises:

a first sub-rotor that is associated with one of the plurality of linked structures;

a second sub-rotor that is associated with a different one of the plurality of linked structures; and a connector for connecting the first and second sub-rotors to one another.

4. An array of articulable masts, as claimed in claim 3, wherein:

the connector includes a sleeve that connects and the first and second sub-rotors with one another such that the longitudinal axes of the first and second sub-rotors are substantially collinear.

5. An array of articulable masts, as claimed in claim 3, wherein:

the connector includes a circular element associated with each of the first and second sub-rotors.

6. An array of articulable masts, as claimed in claim 5, wherein:

the circular element associated with each of the first and second sub-rotors is one of: (a) a gear and (b) a pulley.

7. An array of articulable masts, as claimed in claim 3, wherein:

the connector includes an intersecting connector for transferring torque between the first and second sub-rotors when the longitudinal axes of the first and second rotors intersect and are not collinear.

8. An array of articulable masts, as claimed in claim 7, wherein:

the intersecting connector includes one of: (a) a pair of gears that engage one another and (b) a universal joint.

9. An array of articulable masts, as claimed in claim 1, wherein:

the base has a planar characteristic.

10. An array of articulable masts, as claimed in claim 1, wherein:

the base comprises a plurality of sub-bases that are separated from one another.

11. An array of articulable masts, as claimed in claim 1, wherein:

the rotor structure comprises:

a first sub-rotor that is associated with a first linked structure of the plurality of linked structures and operatively engages a first wire of the plurality of wires that is associated with the first linked structure;

a second sub-rotor that is associated with the first linked structure and operatively engages a second wire of the plurality of wires that is associated with the first linked structure.

12. An array of articulable masts, as claimed in claim 11, wherein:

the first and second sub-rotors are substantially parallel.

13. An array of articulable masts, as claimed in claim 12, wherein:

the first and second sub-rotors defines a rotor plane;

wherein, when the plurality of links of the first linked structure are aligned with one another, the first linked structure has a first linked structure longitudinal axis;

wherein the first linked structure longitudinal axis is one of: (a) perpendicular to the rotor plane; (b) at an angle to the rotor plane, (c) parallel to the rotor plane, and (d) coincident with the rotor plan.

14. An array of articulable masts, as claimed in claim 1, wherein:

each of the plurality of linked structures includes a plurality of springs, wherein each of the plurality of springs is located between an immediately adjacent pair of links of the plurality of links.

15. An array of articulable masts, as claimed in claim 14, wherein:

at least one of the plurality of springs is a conical spring.

16. An array of articulable masts, as claimed in claim 1, wherein:

at least one linked structure of the plurality linked structures includes a tension adjustment structure for adjusting the distance between the fixed terminal link and the base to adjust the tension in a wire of the plurality of wires.

17. An array of articulable masts, as claimed in claim 1, wherein:

at least one linked structure of the plurality linked structures includes a position adjustment structure for adjusting the position of a directional element operatively attached to the directional element interface of the free terminal link.

18. An articulable mast for use with a directional element, comprising:

a base;

a linked structure comprising a plurality of links including:

a fixed terminal link that defines a first terminal end of the linked structure;

a free terminal link that defines a second terminal end of the linked structure;

wherein each of the fixed and free terminal links is pivotally connected to only one link of the plurality of links;

wherein each of any intermediate links located between the fixed and free terminal links is pivotally connected to two other links of the plurality of links;

wherein the fixed terminal link is operatively connected to the base such that the position of the fixed terminal link is substantially fixed relative to the base;

wherein the free terminal link provides an directional element interface for operatively engaging a directional element structure with a boresight and is capable of being moved relative to the fixed terminal link to reposition the boresight of a directional element structure attached to the directional element interface;

wherein, when the plurality of links are aligned with one another, the linked structure has a linked structure longitudinal axis;

a first wire operatively engaged to the linked structure;

a second wire operatively engaged to the linked structure;

a first rotor operatively engaged to the first wire and having a first longitudinal axis; and a second rotor operatively engaged to the second wire and having a second longitudinal axis;

wherein each combination of rotational positions of the first and second rotors corresponds to a different position for the free terminal link of the linked structure which allows the boresight of a directional element structure attached to the directional element interface to be positioned coincident or parallel to a different radius of a spherical section having a center associated with the first terminal end of the linked structure;

wherein the first longitudinal axis of first rotor lies in a first plane this is perpendicular to the linked structure longitudinal axis;

wherein the second longitudinal axis of the second rotor lies in a second plane that is perpendicular to the linked structure longitudinal axis.

19. An articulable mast for a directional element, as claimed in claim 18, wherein:

the first and second longitudinal axes of the first and second rotors define a rotor plane.

20. An articulable mast for a directional element, as claimed in claim 19, wherein:

the rotor plane, first plane, and second plane are the same plane.

21. An articulable mast for a directional element, as claimed in claim 20, wherein:

the first and second longitudinal axes of the first and second rotors are substantially parallel to one another.

22. An articulable mast for a directional element, as claimed in claim 19, wherein:

there is an angle between the rotor plane and the linked structure longitudinal axis.

23. An articulable mast for a directional element, as claimed in claim 22, wherein:

the angle is other than a right angle.

24. An articulable mast for a directional element, as claimed in claim 23, wherein:

the axes of the first and second rotors are substantially parallel to one another.

25. An articulable mast for a directional element, as claimed in claim 22, wherein:

the angle is substantially a right angle.

26. An articulable mast for a directional element, as claimed in claim 25, wherein:

the axes of the first and second rotors are substantially parallel to one another.

27. An articulable mast for a directional element, as claimed in claim 18, wherein:

the longitudinal axes of the first and second rotors are non-parallel and non-intersecting.

28. An articulable mast for a directional element, comprising:

a base;

a linked structure comprising a plurality of links including:

a fixed terminal link that defines a first terminal end of the linked structure;

a free terminal link that defines a second terminal end of the linked structure;

wherein each of the fixed and free terminal links is pivotally connected to only one link of the plurality of links;

wherein each of any intermediate links located between the fixed and free terminal links is pivotally connected to two other links of the plurality of links;

wherein the fixed terminal link is operatively connected to the base such that the position of the fixed terminal link is substantially fixed relative to the base;

wherein the free terminal link provides an directional element interface for operatively engaging a directional element structure with a boresight and is capable of being moved relative to the fixed terminal link to reposition the boresight of a directional element structure attached to the directional element interface;

wherein, when the plurality of links are aligned with one another, the linked structure has a linked structure longitudinal axis;

a wire operatively engaged to the linked structure with a portion of the wire fixed in place relative to one of the plurality of links;

a rotor operatively engaged to the wire and having a rotor longitudinal axis;

wherein each different rotational position of the rotor corresponds to a different position for the free terminal link of the linked structure and allows the boresight of a directional element structure attached to the directional element interface to be positioned coincident or parallel to a radius of circular section having a center associated with the first terminal end of the linked structure;

wherein the rotor longitudinal axis of the rotor is not parallel to the linked structure longitudinal axis.

29. An articulable mast for a directional element, as claimed in claim 28, wherein:

the rotor longitudinal axis lies in a plane that is substantially perpendicular to the linked structure longitudinal axis.

30. An articulable mast for a directional element, as claimed in claim 28, wherein:

the linked structure includes a conical spring located between an immediately adjacent pair of links of the plurality of links.

31. An articulable mast for a directional element, as claimed in claim 28, wherein:

the linked structure includes a pair of conical springs located between an immediately adjacent pair of links of the plurality of links.

32. An articulable mast for a directional element, as claimed in claim 31, wherein:

the pair of conical springs are located to apply opposing moment forces relative to a pivot axis between the immediately adjacent pair of links in the plurality of links.

33. An articulable mast for a directional element, as claimed in claim 28, wherein:

the linked structure includes a tension adjustment structure for adjusting the distance between the fixed terminal link and the base surface to adjust the tension in the wire.

34. An articulable mast for a directional element, as claimed in claim 28, wherein:

the linked structure includes a position adjustment structure for adjusting the position of a directional antenna operatively attached to the directional element interface of the free terminal link.

* * * * *